Aug. 5, 1958  D. E. SHELBY  2,846,078
DRUM RACK
Filed Oct. 13, 1954  2 Sheets-Sheet 1
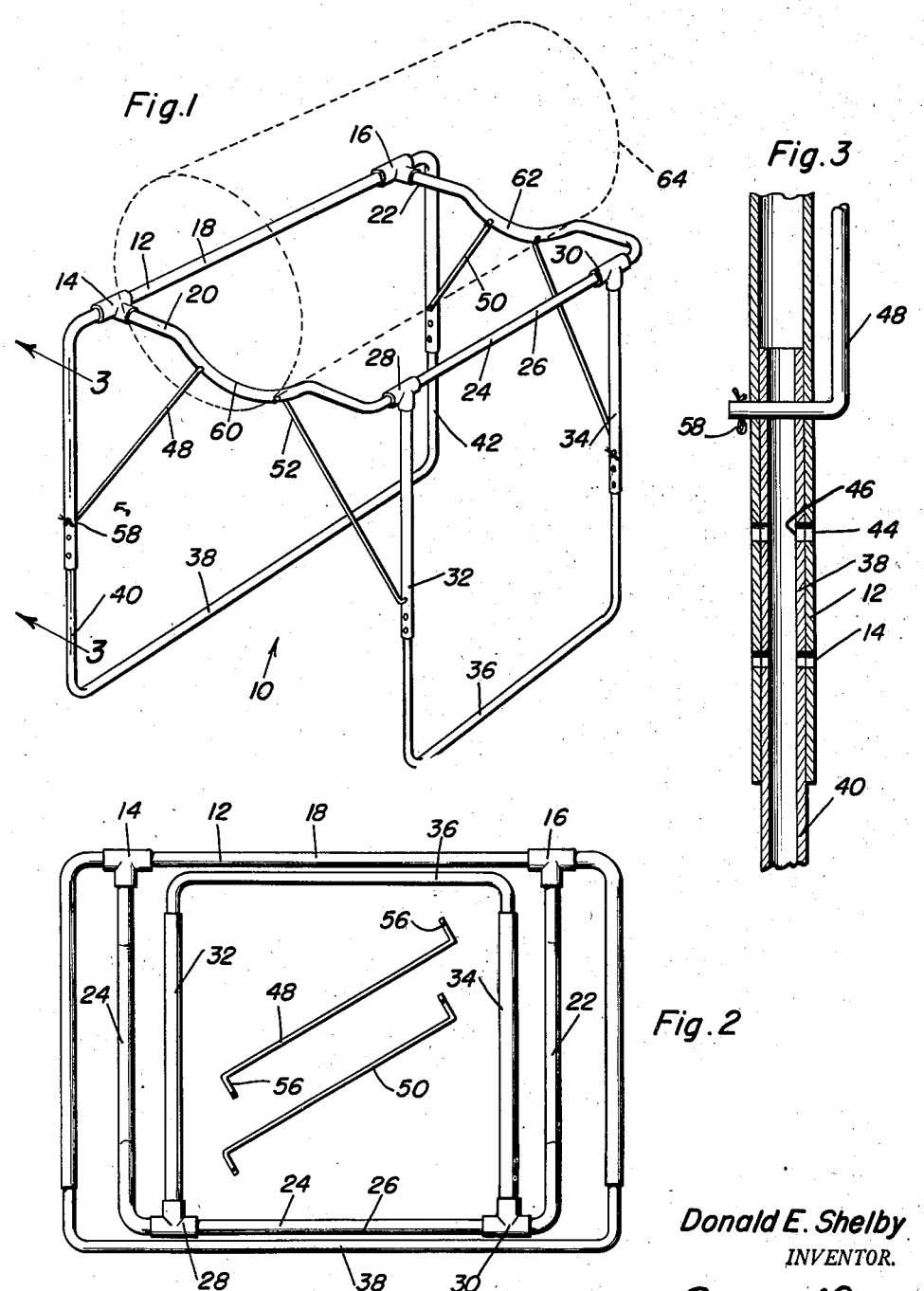
Donald E. Shelby
INVENTOR.

Aug. 5, 1958  D. E. SHELBY  2,846,078
DRUM RACK
Filed Oct. 13, 1954  2 Sheets-Sheet 2
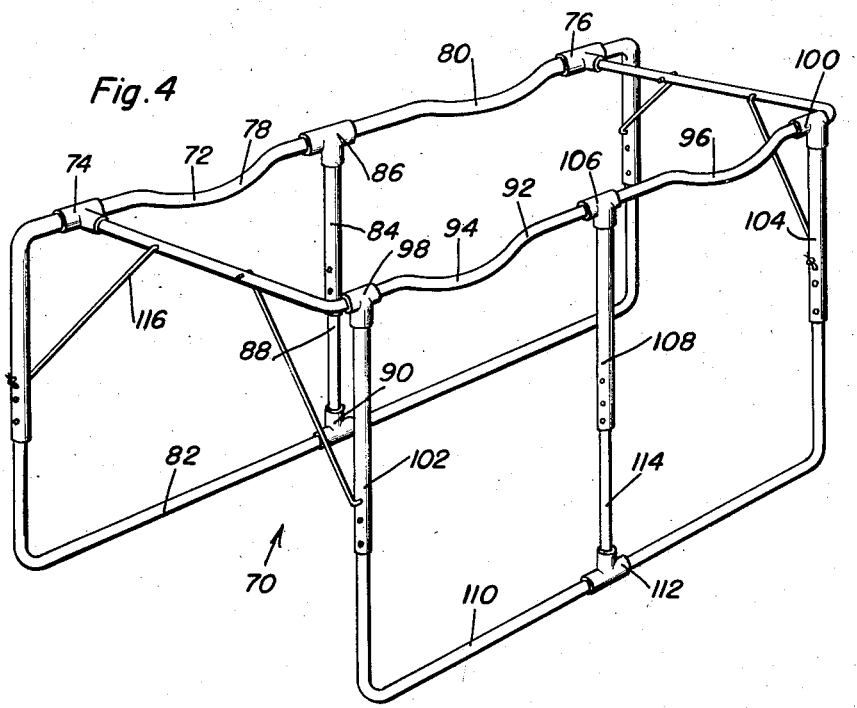
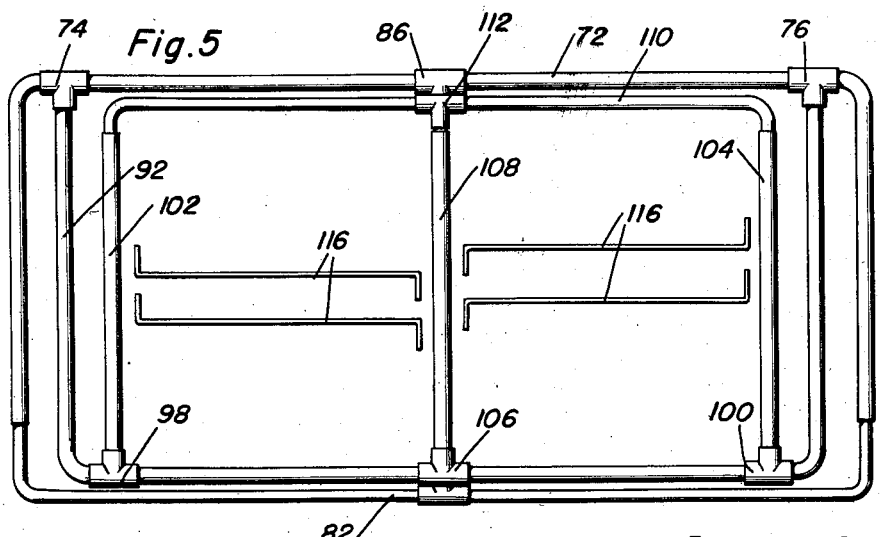
Donald E. Shelby
INVENTOR.

United States Patent Office 2,846,078
Patented Aug. 5, 1958

2,846,078

DRUM RACK

Donald E. Shelby, Flint, Mich., assignor to Kenneth W. Poling, Flint, Mich.

Application October 13, 1954, Serial No. 462,018

3 Claims. (Cl. 211—85)

This invention relates to a novel rack for supporting a drum of fuel, water or the like in a convenient manner.

The primary object of the present invention resides in the provision of a supporting structure for a drum of fuel or water for use in conjunction with a trailer or like vehicle whereby the drum may be supported at a convenient height so as to feed fluid by gravity.

A further object of the invention resides in the provision of a suitable trailer drum rack which is capable of being readily and easily collapsed for storage when not in use.

Still another object of the invention lies in the novel means utilized for bracing the trailer drum rack while enabling the height at which a drum is supported to be adjusted.

Still further objects and features of this invention reside in the provision of a trailer drum rack that is strong and durable, simple to erect, constructed from various easily produced elements, and which may be folded to a comparatively small compass for storage.

These, together with the various ancillary objects and features of the invention which will become apparent as the following description proceeds, are attained by this trailer drum rack, preferred embodiments of which have been illustrated in the accompanying drawings, by way of example only, wherein:

Figure 1 is a perspective view of an embodiment of the trailer drum rack adopted to support a single drum in a convenient manner;

Figure 2 is a plan view of the trailer drum rack shown in a folded state;

Figure 3 is an enlarged sectional view as taken along the plane of line 3—3 in Figure 1;

Figure 4 is a perspective view of a modified form of trailer drum rack; and

Figure 5 is a plan view of the modified form of trailer drum rack shown in a folded position.

With continuing reference to the accompanying drawings wherein like reference numerals designate similar parts throughout the various views, reference numeral 10 is used to generally designate a first embodiment of the invention. This trailer drum rack is constructed from a generally vartically arranged inverted substantially U-shaped tubular member 12 which has substantially T-shaped fittings 14 and 16 rotatably mounted on the central portion 18 of the U-shaped member 12.

Secured to the T-shaped fittings 14 and 16 in any suitable manner are the legs 20 and 22, respectively, of a horizontally disposed U-shaped member 24 having a central portion 26 with T-shaped fittings 28 and 30 rotatably mounted thereon.

Received in the T-shaped fittings 28 and 30 and secured thereto are tubular legs 32 and 34. Telescopically received in the tubular legs 32 and 34 is a relatively small U-shaped leg extension 36, while a relatively large U-shaped leg extension 38 has its upwardly extending portions 40 and 42 telescopingly received within the tubular U-shaped member 12.

As is seen best in Figure 3, the U-shaped member 12 may be provided with a series of spaced apertures 44 therein, and other apertures 46 may be vertically spaced and provided in the legs 40 and 42 of the U-shaped leg extension 38. Extending into aligned apertures 44 and 46 are a pair of braces 48 and 50 of substantially elongated Z-shape which also have ends received in suitable apertures in the legs 20 and 22 of the U-shaped member 24. Braces 52 and 54 are likewise received in aligned apertures in the tubular legs 32 and 34 as well as in the U-shaped leg extension 36. The braces may be formed with suitable apertures 56 therethrough adjacent the ends thereof so that cotter keys, as at 58, may be used to retain the braces in their selected position. It is noted that the braces will hold the leg extensions 36 and 38 in an adjusted vertical position, as desired.

The legs 20 and 22 of the U-shaped member 24 are provided with arcuate depressions 60 and 62, respectively, for receiving a drum, such as is generally designated by reference numeral 64 and shown in phantom lines in Figure 1. Hence, the drum will be supported in a secure and stable manner.

In Figure 2, the trailer drum rack 10 is shown in a collapsed position. As can be readily seen, the tubular legs 32 and 34 together with the leg extension 36 can be folded to seat within the confines of the U-shaped member 24 which, in turn, is folded to fit within the confines of the U-shaped member 12, as well as the leg extension 38.

Referring now to the embodiment of the invention as is shown in Figures 4 and 5, it will be noted that herein there is disclosed a trailer drum rack generally designated by the reference numeral 70 which includes a vertically disposed substantially U-shaped tubular member 72 which has a pair of T-shaped fittings 74 and 76 rotatably mounted thereon and which is provided with arcuate depressed portions 78 and 80. Received within the tubular U-shaped member 72 is a leg extension 82 of comparatively large size. A tubular rigidifying member 84 is seated within a T-shaped fitting 86 rotatably carried by the U-shaped member 72, and a telescoping member 88 is received within the tubular member 84 and adjusted relative thereto, the telescoping member 88 being seated in a T-shaped fitting 90 rotatably carried by the leg extension 82.

Secured to the T-shaped fittings 14 and 76 is a horizontally disposed U-shaped member 92 which has depressed portions 94 and 96 therein opposed to the arcuate depressions 78 and 80 thus forming seats for a pair of drums. T-shaped fittings 98 and 100 are rotatably mounted on the U-shaped member 92, and legs 102 and 104 are secured to the T-shaped fittings 98 and 100. A T-shaped fitting 106 is provided for rotatably mounting the tubular support member 108. Adjustably telescopically received in the legs 102 and 104 is a leg extension 110 which carries a T-shaped fitting 112 to which a telescoping member 114 is secured, the telescoping member 114 being telescopingly slidably adjustable within the tubular member 108.

Braces, such as are indicated at 116, are terminally secured to the U-shaped member 92 and to the leg portions of the U-shaped member 72 and to the legs 102 and 104 similarly to the manner in which the braces of the embodiment of the invention shown in Figures 1 through 3 are secured, whereby the leg extensions 110 and 82 are held in a vertically adjusted position.

In Figure 5, there is shown the invention in a collapsed state wherein the leg extension 110 and the legs 102 and 104 are received within the confines of the U-shaped member 92 which, in turn, is substantially received within the confines of the U-shaped member 72 as well as the leg extension 82.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A drum rack comprising a vertically disposed inverted substantially U-shaped tubular member, a first pair of T-fittings rotatably mounted on said U-shaped member, a horizontally disposed substantially U-shaped member secured to said first pair of T-fittings, a second pair of T-fittings rotatably mounted on said horizontally disposed U-shaped member, and tubular legs secured to said second pair of T-fittings, said vertically disposed U-shaped member and said horizontally disposed U-shaped member having opposed arcuate depressed portions.

2. A drum rack comprising a vertically disposed inverted substantially U-shaped tubular member, a first pair of T-fittings rotatably mounted on said U-shaped member, a horizontally disposed substantially U-shaped member secured to said first pair of T-fittings, a second pair of T-fittings rotatably mounted on said horizontally disposed U-shaped member, and tubular legs secured to said second pair of T-fittings, a relatively large U-shaped leg extension adjustably received in said vertically disposed U-shaped tubular member, said large U-shaped leg extension and said vertically disposed U-shaped member having aligned apertures therethrough, and a relatively small U-shaped leg extension adjustably received in said legs, said legs and said small U-shaped leg extension having aligned apertures therethrough, and brace means extending between said horizontally disposed U-shaped member and said legs as well as said vertically disposed U-shaped member received in selected of said aligned apertures adjustably holding said relatively large leg extension and said relatively small leg extension in an adjusted position.

3. A drum rack comprising a vertically disposed inverted substantially U-shaped tubular member, a first pair of T-fittings rotatably mounted on said U-shaped member, a horizontally disposed substantially U-shaped member secured to said first pair of T-fittings, a second pair of T-fittings rotatably mounted on said horizontally disposed U-shaped member, and tubular legs secured to said second pair of T-fittings, a relatively large U-shaped leg extension adjustably received in said vertically disposed U-shaped tubular member, and a relatively small U-shaped leg extension adjustably received in said legs, and brace means extending between said horizontally disposed U-shaped member and said legs as well as said vertically disposed U-shaped member adjustably holding said relatively large leg extension and said relatively small leg extension in an adjusted position, said vertically disposed U-shaped member and said horizontally disposed U-shaped member having opposed arcuate depressed portions.

References Cited in the file of this patent

UNITED STATES PATENTS

| Number | Name | Date |
|---|---|---|
| 957,880 | Harrington | May 7, 1910 |
| 1,509,717 | Davis | Sept. 23, 1924 |
| 1,519,506 | Powers | Dec. 16, 1924 |
| 2,230,511 | Luttrup | Feb. 4, 1941 |
| 2,480,412 | King | Aug. 30, 1949 |
| 2,527,796 | Clute | Oct. 31, 1950 |
| 2,558,611 | Emmart | June 26, 1951 |

FOREIGN PATENTS

| Number | Country | Date |
|---|---|---|
| 482,337 | Italy | of 1953 |
| 695,333 | France | of 1930 |